Oct. 8, 1968  FRIDTJOF AAGAARD ETAL  3,405,209
METHOD OF DRUM FLAKING A DIFFICULTY CRYSTALLIZABLE MATERIAL
Filed July 6, 1964  2 Sheets-Sheet 1

INVENTORS.
FRIDTJOF AAGAARD
JOSEPH PETER ZANGARA
BY
Samuel Frank Walker
ATTORNEY

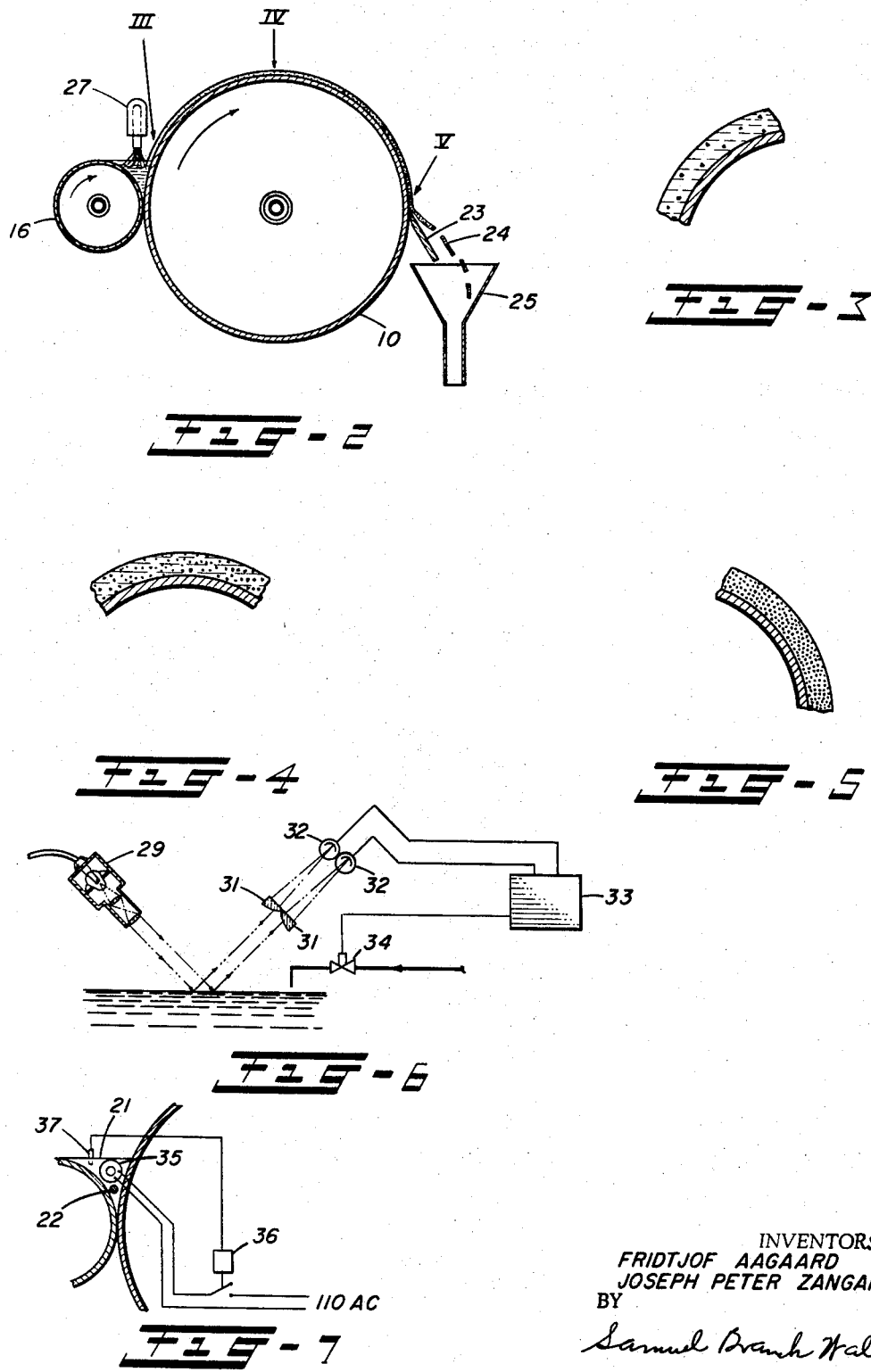

3,405,209
METHOD OF DRUM FLAKING A DIFFICULTLY CRYSTALLIZABLE MATERIAL
Fridtjof Aagaard, Rahway, and Joseph Peter Zangara, Bound Brook, N.J., assignors to American Cyanamid Company, Stamford, Conn., a corporation of Maine
Filed July 6, 1964, Ser. No. 380,340
4 Claims. (Cl. 264—144)

ABSTRACT OF THE DISCLOSURE

Difficultly crystallizable liquids such as 4,4'-ditertiary-octyl diphenylamine are readily crystallized by feeding as a liquid to an agitated pool between an upward moving flaker drum at 50° to 60° C. and an adjacent downward moving crystallizing shear roll at 70° to 80° C., while feeding the molten liquid to the pool, and maintaining crystals in the agitated pool.

---

This invention relates to a method for converting a difficultly crystallizable liquid to flaked solid form by pouring the liquid, above its crystallization point, into the bite of a flaker drum and a crystallizing roll, which cool and induce nucleation, primarily by shear action and seeding, which crystallization is completed on the surface of the flaker roll.

The problem of inducing crystallization in supercooled liquids or supersaturated solutions has been with the chemist for a long time. One of the marks of smooth technique of an experimental chemist has been his success at inducing crystallization of a supersaturated solution or melt so that a product could be obtained in crystalline form. One of the standard techniques has been to scratch the wall of a test tube or beaker with a glass rod to set up local stressing and energy input to generate nuclei or centers from which crystallization could proceed. With liquid materials, usually purer materials crystallize more readily as small quantities of impurities at times interfere with crystallization.

Two general types of crystallization are used by the chemical engineer, although there is not a sharp line between them. Solution crystallization is crystallization from a solution of a solute in a solvent. Usually through change of the solvent system or temperature, or both, solubility is altered so that the solute is no longer soluble at an existing concentration and hence precipitates out, preferably in a crystalline form. The other class is melt crystallization in which the material which is molten crystallizes out as it cools and substantially all of the material changes into a solid form, preferably most of it crystalline, although some amorphous material may remain. If the quantity of impurities in a melt crystallization becomes too great, some of the characteristics approach that of solution crystallization from a concentrated solution.

Thermodynamically, melting and crystallization are essentially opposed reversible processes but, kinetically, crystallization may be and usually is the slower phenomenon and hence more reliable transition temperature data may be rapidly obtained from melting crystallized material than by crystallizing molten material. A pure crystalline substance usually has a sharp melting point. Less pure materials have a melting range, from the sintering or softening point or temperature at which the crystalline material first becomes soft and, in effect, has solid particles with a little liquid on them, to the top of the melting range or temperature of total melting, at which the last crystals disappear in the melt. In cooling, thermodynamically, the first crystals should appear at the same temperature as the last crystals disappeared on melting but, in practice, kinetically, the mechanism is slower. The first crystals frequently appear at a somewhat lower temperature on cooling than the last crystals disappear on heating; although in both instances the rate of temperature change has an important influence. In crystallization, the crystallization point, as the term is used here, is the temperature at which crystals will first appear under the rate of temperature change and agitation conditions in question. For reproducible measurement the rate of temperature change and agitation need to be specified or implied or inherent. For most liquids viscosity increases with a drop in temperature. As crystals appear in the liquid at its crystallization point the viscosity usually tends to continue to increase; and after the ratio of crystals in the liquid becomes large enough so that the crystals are touching each other the apparent viscosity increases markedly.

The setting point is the temperature at which a liquid sets or congeals, that is, the liquid becomes non-Newtonian in character although it is still softer than fully frozen material. This is above the softening point, and cooler than the top of the melting range, or the crystallization point. The setting point on cooling in crystallization corresponds to a slightly more liquid state than the softening point or start of the melting range, for a thermodynamically stable condition. Frequently because of kinetic considerations, it is somewhat below the softening point. In general, the definitions tend to be a little ambiguous and, frequently, there are inherent or assumed limitations not expressed as such in the definitions.

Various approaches have been used to speed melt crystallization. One method is that disclosed in U.S. Patent 2,555,309, H. A. Beam, "Flaking Machine and Method," June 5, 1951, in which a liquid to be crystallized is spread on the surface of a cooled flaking drum by turning in a trough of the liquid to be flaked. At a point where the cooling of the film to the set point temperature has occurred, the film is stressed by a transversely oscillating wire brush which stirs, supplies energy, and induces crystallization.

Another method is shown in U.S. Patent 2,613,396, Montgomery and Hegg, "Method for Flaking Fused Crystalline Solids," Oct. 14, 1952, with particular reference to use for the well-known insecticide DDT. In this patent is described a flaking drum which rotates in a trough of the melt. A roller rotating in the same angular direction as the flaker drum and closely adjacent to the flaker drum is located at the point where the film has cooled to its melting point to work the film and induce crystallization.

It has now been found that superior and rapid crystallizing and flaking can be obtained by using a comparatively large horizontal flaker drum adjacent to which is a parallel, horizontal, crystallizing shear roll, conveniently smaller, which is rotated adjacent to the flaker drum and with a higher peripheral speed, and spaced so that there is a comparatively small gap between the drum and roll, too small for an appreciable quantity of the material being crystallized to flow through, so that the crystallizing shear roll gives a strong agitation to the material in the bite. Preferably the shear roll rotates in the same angular direction as the flaker drum, with the flaker drum rising out of the pool of liquid in the bite between the rolls, and the shear roll rotating into the pool of liquid, and at a higher surface speed, preferably markedly higher. The shear roll can also rotate out of the liquid pool, and carry liquid around with the shear roll, providing that the film thickness is such that a build-up does not occur on the low side of the bite. If the shear roll rotates into the liquid pool, the problem of build-up and speed and temperature control is minimal. The material to be crystallized and flaked is fed as a liquid into the bite at a temperature above its crystallization temperature. Partial cooling occurs in the bite and with strong agitation and shear, a small portion of the material becomes crystalline, furnishing crystallization nuclei on which crystallization and solidification can occur. Additionally, a thin solid layer builds up on the crystallizing shear roll, which layer is partially torn off by contact with the flaker drum, furnishing seed crystals to additionally nucleate the material in the bite. A gap between the drum and roll of 0.020 to 1/8 inch gives good results. The gap size is not critical, so spacing somewhat outside of the preferred range gives satisfactory results.

Whereas in prior art processes, accurate cooling control was required to achieve agitation at the correct thermal point, with the present apparatus and method, the viscosity of the liquid increases as the temperature drops so that if the temperature of the material in the bite drops a thicker film remains on the flaker drum, and as the material is being removed at a higher rate, the pool of liquid in the bite drops and a smaller quantity is present, hence the rate of heat transfer to the pool liquid diminishes and its temperature rises. Conversely, if the pool tends to fill too high, more cooling is achieved and the liquid becomes thicker and the rate of removal on the surface of the flaker drum is increased. Thus, for minor variations in process conditions, the apparatus and method achieves an autostabilizing effect, which avoids the necessity for precision in process control.

The above and other advantages of the present invention more clearly appear to those skilled in the art from an illustration of the invention by a specific embodiment, as shown in the following example and drawings in which:

FIGURE 2 is a cross-sectional view showing a cross section of the principal elements.

FIGURE 3 is a detailed view at III of FIGURE 2 showing the melt with a small percentage of solids as it leaves the bite between the roll and the drum.

FIGURE 4 is a view at IV of FIGURE 2 of the top of the flaker drum showing about half of the material in crystalline form.

FIGURE 5 is a view at V of FIGURE 2 showing the mixture in substantially solid and crystalline form just before it is flaked from the flaker drum.

FIGURE 6 is a diagrammatic view of an optical liquid level control system to effectuate major process controls.

FIGURE 7 is a view of the end plate or dam between the roll and the drum to prevent liquid from flowing out of the bite.

Figure 1:
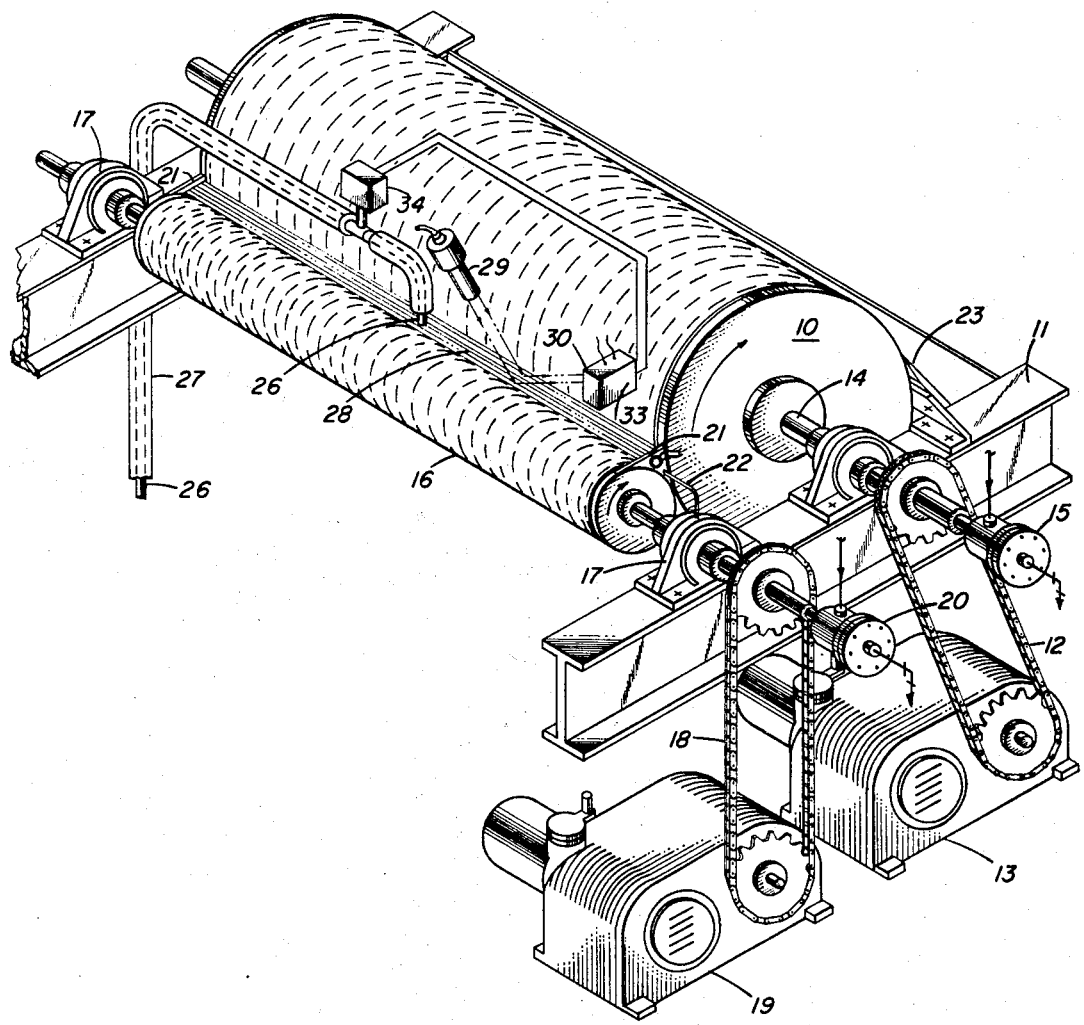
FIGURE 1 is a pictorial assembly view of the apparatus in operation.

The following description of the apparatus describes a typical use, namely crystallizing 4,4'-ditertiaryoctyl diphenylamine. 4,4'-ditertiaryoctyl diphenylamine, also named p,p'-di(1,1,3,3-tetramethyl)butyl diphenylamine, is a rubber antioxidant generically described and claimed in U.S. Patent 2,009,480, David Craig, "Antioxidant," July 30, 1935. Additional details concerning one method of crystallizing are described in U.S. Patent 2,776,994, Wolfe and Conklin, "Preparation of a Solid Diphenylamine Antioxidant," Jan. 8, 1957. The commercial grade is conveniently prepared by reacting diphenylamine with diisobutylene in the presence of a Friedel-Crafts catalyst, such as aluminum chloride. Some 4-monotertiaryoctyl diphenylamine and some polyisobutylene remain in the synthesis mixture, with small quantities of other by-products. Commercially it is more expedient to leave some of these impurities in the product than to attempt to achieve very high purity.

One of the problems, commercially, is crystallization and flaking of the product so as to obtain a dry, commercially acceptable, material which is easily used in rubber compounding. Commercial grades of the material are sold containing from 80 to 90% of 4,4'-ditertiaryoctyl diphenylamine; with the remainder principally the 4-monotertiaryoctyl diphenylamine, some polyisobutylene and minor quantities of various isomers, rearrangement products and decomposition products of unresolved composition.

As shown in FIGURES 1 and 2, the crystallization and flaking is accomplished on a horizontal flaker drum 10, which is suitably journaled on a frame 11. The flaker drum is turned by a flaker drum drive chain 12 from a variable speed drive 13. Through a flaker drum hollow shaft 14 a heat transfer medium, preferably a liquid, is fed into and out of the drum through a flaker drum heat transfer medium seal 15.

Adjacent, horizontal, and parallel to the flaker drum is a crystallizing shear roll 16. The crystallizing shear roll revolves in the shear roll journals 17 and is rotated by a shear roll drive chain 18 from a shear roll variable speed drive 19. The temperature of the shear roll is controlled by introducing and removing a shear roll heat transfer medium through the shear roll heat transfer medium seal 20. The gap between the flaker drum and the parallel crystallizing shear roll is preferably between about 0.020 and 1/8 inch. If the gap is too small the shear roll may contact and score the flaker drum. If the gap is too great, particularly in start up, part of the liquid mixture may flow between the roll and the drum and in use the build-up of solidified material on the shear roll would be so thick as to interfere with heat transfer. Fortunately, unexpectedly and fortuitously, the build-up of solidified mixture on the surface of the shear roll is such that minor mechanical deviations from parallelicity and cylindricity of both the flaker drum and the shear roll are compensated. In a typical installation in which the flaker drum has about a 24 inch diameter and 48 inch length and the shear roll has about an 8 inch diameter and a 48 inch length the inherent eccentricity compensating characteristics are most helpful and a gap of about 0.040 inch gives excellent results. Mechanical tolerances in assembly and unequal thermal expansion are so compensated that the device is easy to operate and forgiving of errors.

Adjacent to the ends of the flaker drum and shear roll are heated end dams 21. These dams are either of a nonadherent plastic or are metal coated with a nonadherent plastic, such as polyethylene or polytetrafluoroethylene or other halogenated polyalkylene so that the material being flaked has minimum adherence thereto. Under conditions where the material being flaked would otherwise tend to cake and accumulate on the end dams, the end dams are heated so that the mixture will remain liquid and flow off. The end dams closely correspond to the curvature of the flaker drum and shear roll and are close to or slide on the surfaces thereof. The end dams are supported by an end dam support 22, conveniently a bracket attached to the shear roll journal. Other support means may be used if mechanically expedient.

The crystallizing shear roll may be journaled somewhat above or somewhat below the level of the center of the flaker drum but, usually, mechanical construction is simplified if the flaker drum and the shear roll are about the same height. Also, the bite between them into which the mixture as a liquid may be poured is larger and more easily observed and a substantial periphery of the flaker drum is available for cooling.

On the side of the flaker drum away from the shear roll is the doctor blade 23. The doctor blade is a conventional blade resting on the surface of the flaker drum, which scrapes the solidified mixture from the surface of the flaker drum and causes the solidified mixture to crack into flakes 24. A conventional doctor blade may be used with conventional support and adjustment means. As these means are conventional, the drawings do not illustrate the details nor need they be further commented upon. Underneath the doctor blade is a hopper 25 to collect the flakes as they are scraped off. The flakes as they are collected in the hopper are ready to be conveyed by conventional devices to containers for storage and sale.

The liquid mixture to be solidified is fed through a feed pipe 26 having a heat jacket 27 thereon, which controls the temperature at which the mixture is fed from the feed pipe into the agitated pool zone 28 in the bite of the rolls.

An optional liquid level control consists of a light source 29, which shines a beam of light, preferably collimated, on to the surface of the agitated pool zone from which it is reflected to a level detector 30. The level detector, as shown in FIGURE 6, consists of opposed half lenses 31, which focus the reflected light on photodetectors 32. The relative intensity of the reflected beam on each of the photodetectors is a function of the liquid level in the agitated pool zone. The output from the photocells is fed to a controller 33 where it is amplified and in turn controls the mixture feed valve 34. When a constant flaking rate is desired the output from the controller 33 is used to control the temperature of the flaking drum 10 so that the rate of removal of the mixture from the agitated pool zone is increased or decreased by changing the temperature of the flaker drum.

FIGURE 7 shows one heated end dam 21 mounted on a heated end dam support 22 with a heater element 35 controlled by a relay 36 from a thermostat 37. It is desired that the end dams be kept hot enough to prevent caking of mixture thereon and yet not hot enough to cause the ends of the flaked sheet to melt.

In operation the mixture to be flaked is fed as a liquid to an agitated pool zone. In start-up a handful of the mixture in solid crystalline form may be thrown into the bite of the rolls with the liquid material first fed, where it is crushed, mixed with the liquid and spread on the surface of the flaker drum and the shear roll. The temperature of the shear roll is kept just below the initial melting point of the mixture and a sheet of solidified mixture forms on the surface of the shear roll. As the shear roll rotates into the bite the mixture in the agitated pool zone is agitated by contact with the shear roll and drawn down towards the line of minimum clearance between the shear roll and the flaker drum. Friction at this point tends to scrape part of the solidified crystalline mixture from the shear roll and mix the scraped material in with the liquid fed through the feed pipe 26, thus forming nuclei and inducing further crystallization in the agitated pool zone. As the flaking drum rotates upwardly from the agitated pool zone a layer of the mixture, predominantly in liquid form, containing nuclei, is drawn upward with the surface of the flaker drum and is further cooled by contact with the flaker drum. The nuclei present in the agitated pool zone serve as crystallization centers so that the material initially containing a small proportion of solid material, as shown in FIGURE 3 at III, is cooled with additional solidification. Towards the top of the roll, as shown in FIGURE 4, the mixture is approximately half crystallized and solidified. At some point above the contact with the doctor blade, as shown in FIGURE 5, the mixture is essentially solidified and crystallized, and is then scraped off by the doctor blade.

The 4,4'-ditertiaryoctyl diphenylamine synthesis mixture in a typical operation is fed at a temperature of about 90° C. to the agitated pool zone. The shear roll is kept at a temperature between 70° and 80° C. and that of the flaker drum between about 50° and 60° C. The solidification point of the product is about 84–85° C. and hence, the mixture is completely solid before it is scraped off. A 24 inch diameter flaker drum is turned at a speed from 1 to 3 r.p.m. and the shear roll of about 8 inch diameter is rotated between about 25 and 75 r.p.m. The higher speeds and lower temperatures are used when an increased throughput is desired. If less than about 5% of the mixture is in crystal form in the agitated pool zone, the small number of nuclei cause solidification on the flaker drum to be below preferred rates, although satisfactory production at reduced rates may be achieved even when a considerably smaller portion of crystals are present. More than about 10% crystals are unnecessary and, again, slow production because a higher heat extraction rate is required in the pool zone. The product flake is satisfactory up to about 30% solids in the agitated pool zone. If more than about 30% solids exist the mixture tends to lump rather than spread smoothly on the flaker drum and lower quality product results.

If the level of the mixture in the agitated pool zone rises the rate of heat extraction is increased because of the increased area in contact with the flaker drum and the shear roll. As the temperature drops the viscosity of the mixture increases and, hence, the rate of removal by the flaker drum increases which tends to cause the level of the liquid in the agitated pool zone to drop and, hence, the level is self-stabilizing to a considerable extent. If the rate of feed of the liquid mixture or the temperature of the flaker drum and shear roll increases the pool level may tend to rise. The photodetection system, above mentioned, is used to either decrease the rate of liquid mixture fed or to increase the rate of cooling of the flaker drum and/or shear roll to increase the flaking rate and hence cause the level to drop. Because the mass of the flaker drum and shear roll together with their associated heat transfer media is so great, the cooling rate change must be slow to avoid "hunting" and overcontrol. The controller may be set to give a rapid control of the feed rate, with a slower adjustment of the flaker drum and shear roll temperature to provide for long-term variations in process thoughput.

The heat control medium feed to the shear roll and flaker drum may require either a heating or a cooling action to maintain temperature control. The heat content of the mixture as it is supplied, and the heat of crystallization supply heat to the process. Because the surface areas of the flaker drum and shear roll are comparatively great, convection and radiation losses may be greater than the process heat supply. On the other hand, if room temperature is high and ambient air currents are minimal the heat losses may be so low that heat must be removed to maintain the roll and drum at the preferred temperature. Such variations are readily accomplished by those skilled in the chemical engineering arts, and further detail would serve to conceal rather than explain the substantial contributions of the present invention.

Whereas described with particular reference to one antioxidant, other dialkyl-diphenylamines or other difficultly crystallizable organic liquids may be readily solidified and/or crystallized using the teachings above exemplified with the temperature control points adjusted to the physical constants of the mixture under consideration.

Having exemplified advantageous modifications thereof as our invention, we claim:

1. A method of flaking a difficultly crystallizable material which comprises: feeding a difficultly crystallizable material as a liquid at a temperature above its initial crystallizing temperature, to an agitated pool zone, formed in the bite between a flaker drum and a crystallizing shear roll rotating so that the surface of said flaker drum moves upwardly out of said pool zone and the surface of said crystallizing shear roll moves downwardly into said pool zone; maintaining the surface temperature of each of said drum and said roll below the melting range of said material; the motion of said drums and said roll also agitating and simultaneously cooling the material in said pool zone; thus inducing crystal formation in the material by the shearing contact between the material in said pool zone and said crystallizing shear roll and flaker drum; the said upward motion out of said pool zone of the surface of said flaker drum forming a crystal-containing-liquid layer of said material on the surface of the flaker drum, and further extracting heat from and cooling the layer of material on the surface of the flaker drum, thereby forming a solid crystalline layer of said material on the flaker drum surface; scraping the solidified material from the flaker drum, thus forming flakes of the material essentially crystalline in character; and collecting said flakes.

2. A method of flaking a difficultly crystallizable material which comprises: forming an agitated pool zone in the bite between a flaker drum rotating so that its surface is moving continuously upward out of the bite and an adjacent continuously moving closely spaced crystallizing shear roll rotating so that its surface is moving continuously downward into the bite and having on its surface a layer of difficultly crystallizable material in predominantly crystal form; maintaining the surface temperature of each of said drum and said roll below the melting range of said material; feeding said material as a liquid at a temperature above its initial crystallizing temperature into said agitated pool zone, the motion of said drum and said roll also continuously agitating and cooling said material in said zone, while simultaneously shearing at least some crystal fragments from that portion of said material on the crystallizing shear roll, and intermixing the thus sheared crystals and fed liquid with agitation in said agitated pool zone; forming a crystal-containing-liquid layer of said material on the upward moving surface of the flaker drum, which as it leaves said pool zone has not more than about 30% of the material in the crystalline phase, extracting heat from the layer, thereby inducing continued transformation to the crystalline phase, until substantially all of the material is solid; and scraping the solidified material from the flaker drum, thus forming flakes of the material essentially crystalline in character, and collecting said flakes; the rotation of the shear roll into the bite carrying a thin layer of partially crystallized material through the bite, extracting heat therefrom, and thus forming the layer of material in predominantly crystal form which is moved into the pool zone in the bite.

3. The method of claim 2 which includes the steps of simultaneously inherently controlling the liquid level in said liquid pool zone by increasing the heat extraction in said pool zone because of increased liquid volume, and thereby increased area of contact with said drum and said roll if the liquid level rises, hence increasing liquid viscosity, and the rate of material removal in the crystal-containing-liquid layer, and conversely if the liquid level falls, and confining the liquid at the ends of said pool.

4. The method of claim 3 in which the material is 4,4'-ditertiaryoctyl diphenylamine synthesis mixture, the surface temperature of the said shear roll is between about 70° C. and 80° C., and the surface temperature of the flaker drum is between about 50° C. and 60° C. and the feed temperature is above the initial crystallizing temperature of about 85° C.

References Cited

UNITED STATES PATENTS

| | | | |
|---|---|---|---|
| 2,590,544 | 3/1952 | Kallok | 264—144 X |
| 2,613,396 | 10/1952 | Montgomery et al. | 264—144 |
| 3,064,311 | 11/1962 | Bain et al. | 264—144 X |

ROBERT F. WHITE, *Primary Examiner.*

S. I. LANDSMAN, *Assistant Examiner.*